United States Patent [19]

Pottharst, Jr.

[11] 4,260,461
[45] Apr. 7, 1981

[54] VAPOR COMPRESSION DISTILLATION APPARATUS AND METHOD

[76] Inventor: John E. Pottharst, Jr., 861 Carondelet St., New Orleans, La. 70130

[21] Appl. No.: 971,714

[22] Filed: Dec. 21, 1978

Related U.S. Application Data

[63] Continuation of Ser. No. 819,213, Jul. 26, 1977, abandoned.

[51] Int. Cl.³ .......................... B01D 1/28; C02F 1/04; C02F 1/20
[52] U.S. Cl. .............................. 203/7; 203/1; 203/11; 203/26; 203/34; 203/95; 202/176; 202/177; 202/180; 202/235
[58] Field of Search ................... 203/1, 95, 10, 11, 7, 203/26, 24, 34, 35, DIG. 17; 202/181, 235, 176, 177, 180; 55/54

[56] References Cited

U.S. PATENT DOCUMENTS

| | | | |
|---|---|---|---|
| 2,078,288 | 4/1937 | Sherman | 55/54 |
| 2,500,774 | 3/1950 | Sebald | 55/54 |
| 2,671,524 | 3/1954 | Gilwood | 55/54 |
| 2,677,433 | 5/1954 | Kretzschmar | 55/54 |
| 3,218,241 | 11/1965 | Checkovich | 203/7 |
| 3,245,883 | 4/1966 | Loebel | 203/7 |
| 3,300,392 | 1/1967 | Ross et al. | 203/7 |
| 3,458,972 | 8/1969 | Sood | 55/54 |
| 3,748,234 | 7/1973 | Pottharst | 203/26 |

Primary Examiner—Wilbur L. Bascomb, Jr.

[57] ABSTRACT

A vapor compression distillation apparatus and method are provided wherein scaling tendencies are eliminated. The raw feedwater has acid added to it in an amount sufficient to convert the carbonates and/or bicarbonates therein to carbon dioxide. The heated acidified feedwater is then deaerated to remove the carbon dioxide and other non-condensible gases. The deaerated water flows to the evaporator through a line having a valve therein controlled by the liquid level in the deaerator to maintain such level constant even though the tube side of the evaporator is being operated at a pressure less than that of the deaerator. This permits the evaporation to take place under a partial vacuum and at a boiling temperature of less than 212° F. even though the deaerator is operated at atmospheric pressure. Vent steam from the evaporator is added to the deaerator to further preheat the feedwater, and as a sparging or stripping agent to aid in the elimination of carbon dioxide and other non-condensible gases.

3 Claims, 1 Drawing Figure

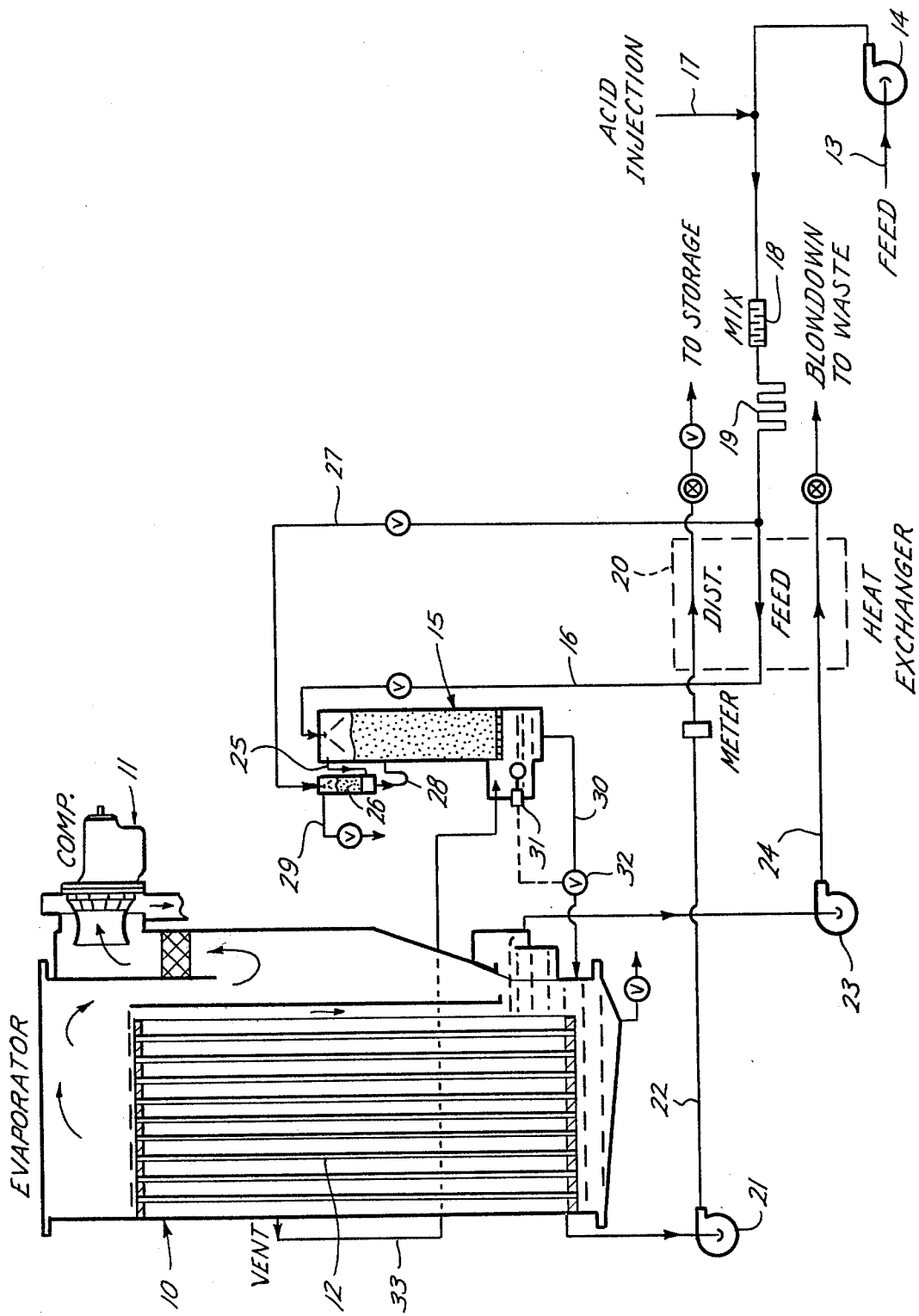

VAPOR COMPRESSION DISTILLATION APPARATUS AND METHOD

This application is a continuation of application Ser. No. 819,213, filed July 26, 1977 and now abandoned.

This invention relates to a vapor compression distillation apparatus and method and particularly to one wherein the scaling tendencies are eliminated when distilling sea water having a high total dissolved solids content.

In the distillation of various waters, especially sea and brackish waters, the conrol of scale deposition has been a significant problem. Various solutions have been suggested such as treatment of the feedwater with acids, phosphates, organic scale preventers and the like. None have been satisfactory especially when applied to high temperature vapor compression distillation units and particularly those intended to operate automatically without any significant operator attention. It has been one practice to treat the raw unheated feedwater with acid (e.g. sulfuric acid). Thus, the two most important scale formers precipitating during distillation of sea water (and in many other waters) are calcium carbonate and magnesium hydroxide. Normally, the calcium exists in the raw water as the bicarbonate and treatment of such water with, for example, sulfuric acid converts the calcium bicarbonate to soluble calcium sulfate and carbonic acid which in turn decomposes to carbon dioxide gas and water. Decarbonation of the acid treated water will remove the carbon dioxide. The acidification of the raw water likewise reduces its hydroxyl ion content so that the soluble magnesium compounds cannot be converted to insoluble magnesium hydroxide.

Thus in accordance with such practice, the carbon dioxide is removed in an atmospheric decarbonator wherein the treated water is scrubbed with air to remove the carbon dioxide. The resulting feedwater is then deaerated in a vacuum deaerator after which it is preheated and passed to the evaporator to undergo the normal vapor compression cycle. In the latter, it has been found desirable and even necessary to use a vent condenser to remove non-condensibles from the shell side of the evaporator.

In such systems, there are problems of getting carbon dioxide and oxygen out of the relatively cold acidified feedwater which normally is at ambient atmospheric temperature. As indicated, vacuum equipment is employed in an effort to achieve this goal and such equipment is not only expensive in initial cost but also has relatively high energy requirements, and vacuum leaks cause maintenance problems.

Moreover, in some areas, such as the Arabian Gulf, the sea water has a high total dissolved solids content making it desirable to operate the evaporator units at a temperature below the normal boiling point, e.g. at 208° and hence at a partial vacuum, in order to avoid calcium sulfate scaling.

It is accordingly a general object of this invention to provide a vapor compression distillation apparatus and method that permits continuous acid treatment of the feedwater to eliminate or minimize carbonate and magnesium scaling while at the same time permitting the evaporator to operate under a partial vacuum to avoid calcium sulfate scaling.

Another object is to provide such an apparatus and method wherein the raw feedwater is acid treated to prevent formation of magnesium hydroxide and to convert bicarbonates to carbon dioxide which is removed from the feedwater in an atmospheric deaerator operated under conditions such that the feedwater is at or slightly above the boiling point of the water being evaporated, to thereby not only facilitate removal of the carbon dioxide and oxygen but also to assure that the feedwater is adequately preheated before passing into an evaporator and wherein the evaporator can be operated under a partial vacuum to avoid calcium sulfate scaling.

These and other objects, advantages and features of the invention will be apparent to one skilled in the art after consideration of the disclosure and claims in conjuction with the drawing wherein there is illustrated a preferred apparatus and method embodying this invention.

Referring to the drawing there is illustrated a basic vapor compression distillation unit including an evaporator 10 and an associated vapor compressor 11. This unit is preferably constructed and operated as described in U.S. Pat. No. 4,002,538 to John E. Pottharst, Jr., which is incorporated hereinto by reference in its entirety.

Generally in such a system, water on the tube side of calandria 12 is vaporized by heat exchange with condensing steam on the shell side of the calandria. The vaporized steam passes downwardly into the downtake and thence upwardly to the vapor compressor 11 wherein it is compressed a few pounds per square inch and then discharged to the shell side of the calandria for condensation as aforesaid.

The raw feedwater in line 13 is pumped by feed pump 14 into the top of deaerator 15 via line 16. Prior to being discharged into the deaerator, the feed is treated with acid (e.g. sulfuric) by an acid injection means 17 which pumps acid into feedwater line 16. Thereafter the acidified feedwater can pass through a mixing device 18 and a reaction time pipe 19, or tank.

Means are provided for preheating the acidified feedwater to an elevated temperature which can be a few degrees below the boiling point thereof. As shown, this means can comprise a heat exchanger 20 in which the feedwater is heat exchanged with hot distillate from distillate pump 21 and line 22 as well as with hot blowdown from blowdown pump 23 and line 24.

The amount of acid to be added should be sufficient to convert the carbonates and/or bicarbonates to carbondioxide, i.e. reduce the pH of the feedwater to about 4.0 to 4.3 pH or the methyl orange end-point, depending upon the salinity and suspended matter of the feedwater.

As indicated, means are provided for deaerating the preheated acidified feedwater to remove substantially all of the carbon dioxide, as well as oxygen and other noncondensibles, therefrom. Such means includes the deaerator 15 which is an atmospheric scrubbing tower packed with packing such as Raschig rings or other suitable packing. As shown, the feedwater passes from line 16 into a sprayhead, spray nozzle, troughs, or other water distributing devices at the top of the deaerator from which it is distributed over the packing material to trickle down the same. As will be explained in greater detail below, steam is injected into the bottom of the deaerator to aid not only in freeing the downcoming feedwater of carbon dioxide and other non-condensibles but also to finally preheat the feed to a temperature substantially equal to and preferably exceeding the temperature of the water circulating in the evaporator. The carbon dioxide and other gases, as well as some steam, flows out of the deaerator via line 25 into an after-condenser 26 wherein it is brought into heat exchange with a coolant, perferable a portion of the unheated feedwater flowing thereinto via line 27. If desired, the raw feedwater, with injected acid, can be used as the coolant. Also while it is preferred that the after-condenser be a small packed tower as shown, shell and tube or other of exchangers can be employed. All or a part of the feedwater can be passed through such an indirect heat exchanger. Also, the after-condenser can be eliminated and the deaerator vented directly to atmosphere; this simpler arrangement is the most preferred practice.

As the vapors flow upwardly in the after-condenser, they are contacted with the downflowing coolant and this condenses nearly all, if not all, of the steam therein so that the resulting condensate flows along with the coolant back to the deaerator via line 28. The amount of coolant should be adjusted, as well as the valve in vent line 29, to be such that a minimum amount of steam and all of the noncondensible gases pass out the vent and also to be such that the pH of the feedwater passing to the evaporator is as high as possible, e.g. approximately 7, or higher. If the amount of coolant is insufficient, not enough steam will be drawn through the deaerator and the feedwater will not be completely deaerated and its pH will be lower than desired. If too much coolant is used, the feed passing down the deaerator will not be heated enough to be completely degassed and again the pH of the feedwater will be lower than desired. Likewise if no after-condenser is used, the treated feed pH is dependent upon proper venting to atmosphere.

Means are provided for flowing the deaerated water from the deaerating means directly into the evaporating means in such a manner that the evaporating means can be operated under a partial vacuum and with a normal water level even though the deaerating means is being operated at atmospheric pressure.

Thus the lower portion of deaerator 15 is directly connected by flow line 30 to the evaporator so that water can flow through line 30 as a result of the difference in pressure in the deaerator and evaporator. In order that the proper liquid level can be maintained in the deaerator and the evaporator, means are provided to sense the liquid level in the deaerator and to accordingly control valve means in line 30 so that the liquid level in the deaerator remains essentially constant. Thus a liquid level control 31 controls valve 32 which in turn controls the rate of flow of deaerated water from the deaerator to maintain the liquid level therein at a constant level. Or, a direct acting float valve may be employed. This permits any desired degree of vaccum to be maintained on the tube side of the evaporator so that the evaporator can be operated at an evaporator brine-blowndown temperature of less than 212° F.

Steam is injected into the deaerator to add additional preheat to the feedwater so that its temperature can be increased to be at least approximately equal to or above that of the water circulating in the evaporator. Also, the injected steam acts as a sparging agent to aid in sweeping the carbon dioxide and other gases from the feedwater falling down the deaerator.

The steam introduced into the deaerator is preferably derived from the shell side of the evaporator at a point where any non-condensible gases will be withdrawn with the vent steam. This permits the conventional vent condenser to be eliminated and its function to be performed by the deaerator.

With the foregoing arrangement, it is possible to deaerate the feedwater sufficiently that the pH of the feedwater passing to the evaporator is in the range of 7 to 7.4. This distillate likewise has a relatively high pH of around 7.4. This is the result of very effective deaeration as caused by steam stripping the acidified raw water at an elevated temperature in the range of 205 to 220° F. The result is that instead of having an average corrosion rate of over 3 ppm copper in the blowdown, as has been the result in the past, the rate is only about 0.2 ppm of copper in the blowdown. Similarly the distillate leaving the unit has a relatively high pH as aforesaid rather than one of the order of 6.4 as in the past and, as a result, is substantially non-corrosive. Further, since the evaporator can operate under a vacuum, as for example, a pressure equivalent to 208° F. boiling point of sea water, scaling by calcium sulfate can be avoided, or measurably reduced, depending upon the amount of $SO_4$ in the feedwater.

The invention having been described what is claimed is:

1. In a vapor compression distillation apparatus wherein a shell and tube evaporator is provided for evaporating water on the tube side of the evaporator by indirect heat exchange with condensing compressed steam on the shell side of the evaporator and means are provided for flowing steam resulting from such evaporation from the tube side of said evaporator to a compressor for compressing such steam and then flowing the compressed steam to said shell side of the evaporator to provide said compressed steam; the improvement for minimizing or eliminating scaling of the apparatus by calcium carbonate and magnesium hydroxide and for removal of carbon dioxide, oxygen and non-condensible gases from the apparatus comprising means for injecting acid into feedwater passing to the evaporator to prevent formation of magnesium hydroxide and to decompose bicarbonates to carbon dioxide; means for heating the feedwater; means connected to the heating means to pass the heated water to a deaerating means, the latter being for deaerating the acidified and heated feedwater to remove substantially all the carbon dioxide, oxygen and noncondensible gases therefrom; a conduit for flowing the deaerated water directly from the deaerating means into the tube side of the evaporator; means in said conduit for controlling the flow of deaerated water therethrough; a conduit by-passing said evaporator for flowing steam and non-condensible gases from a vented portion of the shell side of the evaporator directly to said deaerating means without passing through said evaporator to thereby effectively remove the non-condensible gases from said shell side without using a separate vent condenser and to also permit the deaerating means to be heated with said compressed steam from the shell side of the evaporator so that the deaerating means can operate at a pressure higher than that of the tube side of the evaporator; means for recovering distillate from the shell side of the evaporator; and means for removing blowdown from the evaporator.

2. The apparatus of claim 1 wherein said means in said conduit for controlling flow of deaerated water therethrough is a valve and wherein means are provided for sensing liquid level in the deaerating means and controlling said valve such that the liquid level in the deaerating means remains constant despite pressure changes in the evaporator.

3. In the distillation of water wherein water is evaporated on the tube side of a shell and tube evaporator by heat exchange with compressed steam on the shell side of the evaporator, said compressed steam being supplied by compressing steam evaporated on the tube side fo the evaporator, the improvement including the steps of (a) injecting acid into the feedwater for the evaporator in an amount sufficient to prevent formation of magnesium hydroxide and to convert substantially all of the bicarbonates therein to carbon dioxide;

(b) heating the feedwater;

(c) deaerating the heated and acidified feedwater in a deaerating zone to remove substantially all of the carbon dioxide and non-condensibles therefrom;

(d) operating the deaerating zone at a pressure which is higher than that of the tube side of the evaporator;

(e) flowing the deaerated water from the deaerating zone into the tube side of said evaporator; and (f) passing steam and non-condensibles from a vented portion of the shell side of the evaporator directly to said deaerating zone by-passing the tube side of the evaporator.

* * * * *